Patented Dec. 14, 1943

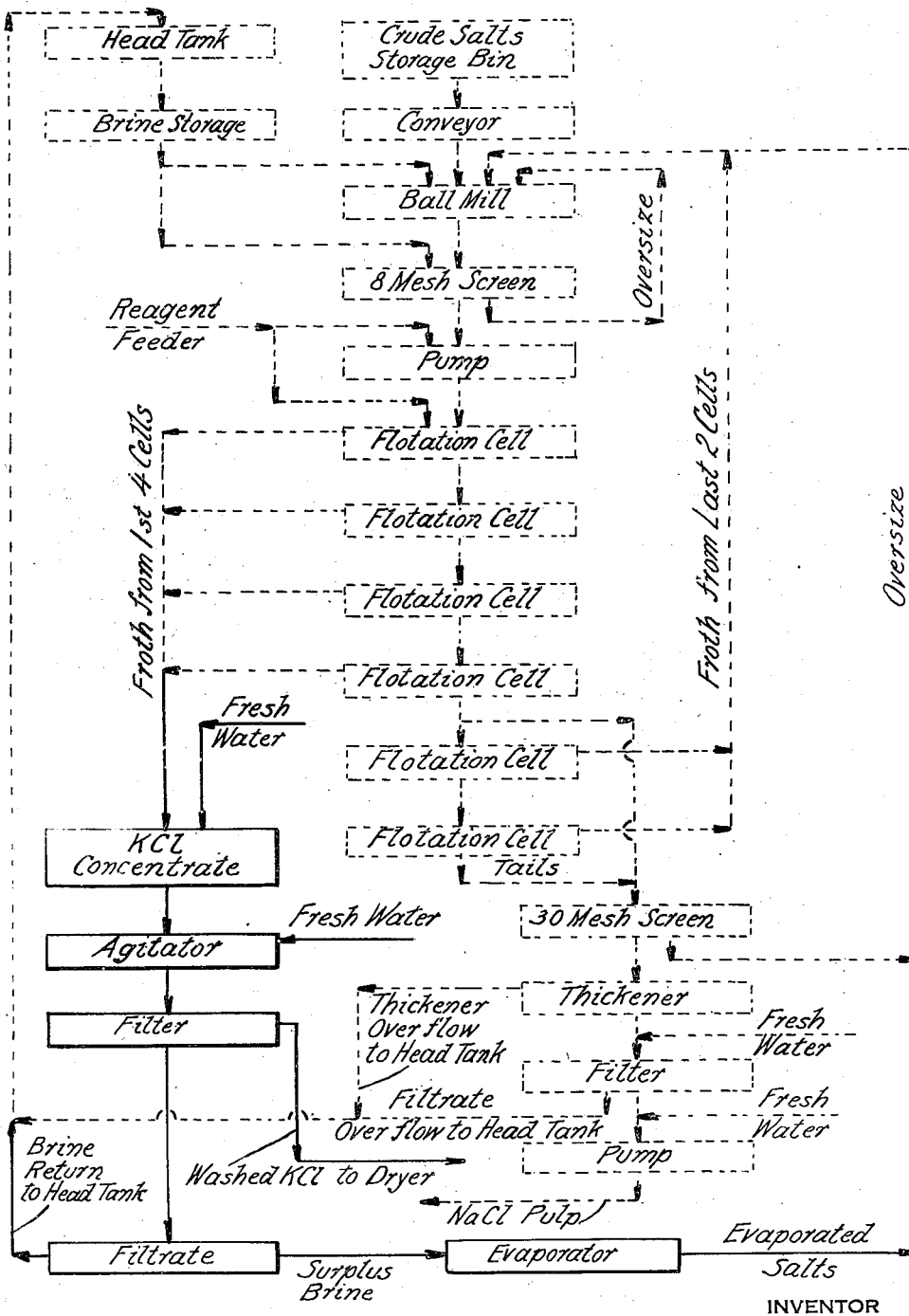

2,336,854

UNITED STATES PATENT OFFICE 2,336,854

METHOD OF TREATING POTASSIUM CHLORIDE CONCENTRATES

Lockwood W. Ferris, Salt Lake City, Utah, assignor to Bonneville Limited, New York, N. Y., a corporation of Delaware Application December 27, 1941, Serial No. 424,570

4 Claims. (Cl. 209—166)

This invention relates to improvements in the separation of potassium chloride from sodium chloride by flotation, and more particularly to improvements by which potassium chloride, relatively free from sodium chloride, may be economically produced.

In the separation of potassium chloride from sodium chloride by flotation, the primary product, solid potassium chloride, is usually obtained in admixture with substantial amounts, e. g., 10% of sodium chloride. The present invention provides improvements by which the potassium chloride is readily obtained in much purer form.

In accordance with the present invention, the potassium chloride, separated by flotation as a froth, as described for example, in my application Serial No. 376,583, filed January 30, 1941, and carrying a substantial amount of sodium chloride, is treated with water in amount sufficient to dissolve all of the sodium chloride but insufficient to dissolve much of the potassium chloride, forming a solution saturated with respect to both salts. The resulting brine is then treated to recover the potassium chloride it contains, as by evaporation to crystallize the salts it contains which are then included in the raw feed. A portion of the brine is advantageously used as the brine in which the feed is pulped.

The single figure of the accompanying drawing illustrates diagrammatically by means of a flow sheet, a method embodying the invention, but the invention is not limited thereto. The flow sheet shows the sequence of operations in a conventional manner, the matter illustrated in broken lines being from the flow sheet of my said copending application, here reproduced for convenience.

In carrying out a method of the invention, a potassium chloride concentrate containing solid particles of potassium chloride, admixed with or adhering to sodium chloride, may be agitated with fresh water in a sufficient amount to dissolve the sodium chloride and a part of the potassium and to form a solution saturated in respect to both potassium chloride and sodium chloride. The potassium chloride remaining in solid form, and substantially free of sodium chloride, is dried and prepared for commercial use. The saturated solution of sodium chloride and potassium chloride is usually in part returned to the process, and in part evaporated to recover the salts contained therein.

When fresh water is agitated with a solid concentrate of potassium chloride containing sodium chloride, the water will saturate itself with respect to the salts present, unless used in excess. At normal temperatures, the resultant brine will contain approximately two parts of sodium chloride and one part of potassium chloride. Thus, with a concentrate containing, for example, ninety parts of potassium chloride and ten parts of sodium chloride, the water required to dissolve out the sodium chloride will dissolve only five parts of potassium chloride. If the amount of water required to produce a saturated solution of sodium chloride is used, the brine will be saturated with both sodium chloride and potassium chloride. The amount of water used in practicing the invention is advantageously that amount which will dissolve out the sodium chloride and form a saturated solution with respect to it. This amount of water will not dissolve an excessive amount of potassium chloride.

In treating a crude salt mixture containing, for example, approximately thirty percent (30%) potassium chloride and the balance essentially sodium chloride in a concentration treatment of the type described in my said copending application, the potassium chloride concentrate is produced as a froth. Briefly, the process is carried out as follows: The crude salt mixture enters the ball mill where it is mixed with a sufficient amount of brine saturated in respect to the component salts, to produce a pulp containing, for example, approximately sixty-five (65%) solids. The salts are preferably ground to separate part of the sodium chloride and potassium chloride particles without overgrinding, and a considerable portion of the salts are insufficiently ground. The ground salts are suitably separated into undersize and oversize portions as by screening, for example, on an 8-mesh screen, the oversize being returned to the ball mill and the undersize admixed with brine being passed to a pump box where sufficient additional brine is added to form a pulp containing, for example, approximately forty percent (40%) solids. This pulp is subjected to flotation with the addition of collector and frother reagents which promote the selective flotation of one of the chlorides, particularly potassium chloride.

In an operation of the type illustrated in the flow sheet, the froth from the first four cells contains solid potassium chloride as the major component and a relatively small amount of adhering and admixed solid sodium chloride. The potassium chloride concentrate usually contains in the neighborhood of ninety percent (90%) potassium chloride and ten percent (10%) of sodium chloride. This concentrate enters the agitator where it is agitated with a carefully regulated amount of water. The amount of water used in the agitator is that required to dissolve substantially all of the sodium chloride and at the same time form a solution saturated with respect to sodium chloride. The water also becomes saturated with respect to potassium chloride but the amount of potassium chloride dissolved is not excessive because the amount of sodium chloride in the concentrate is relatively low and only one-half as much potassium chloride is dissolved as sodium chloride. The sodium chloride-free potassium chloride is sent to storage or otherwise prepared for commercial use.

The brine from the agitator saturated with sodium chloride and potassium chloride is usually in excess of that required to satisfy the mill operation at the head of the process and only a part of the brine is sent to the head tank. The remaining portion of brine is sent to an evaporator, for example, an evaporation pond, for the crystallization of the mixed salt. Since this brine is saturated both in respect to sodium and potassium chlorides at a ratio of approximately two to one, the salts resulting from the evaporation contain roughly one-third potassium chloride and two-thirds sodium chloride. These salts are similar in composition to the crude material entering the mill and are, therefore, put through the mill with the regular heads, with recovery of the potassium chloride.

In a modified method of the invention, the mixture from the agitator including the brine saturated in respect to both sodium chloride and potassium chloride, and the solid remaining potassium chloride, is pumped to a storage pond, in which the brine is separated from the potassium chloride by drainage. The saturated brine, drained off, is clarified and is in part returned to the head tank as required in the milling operation, and the remainder is delivered to an evaporation pond. The salts solidified in the evaporation pond contain about one part potassium chloride and two parts sodium chloride and are returned to the ball mill for grinding and treatment along with the original crude salts.

I claim:

1. In the separation of potassium chloride and sodium chloride from solid crude salt mixtures, the improved method which comprises grinding the crude salt only sufficiently to separate in part the potassium chloride and sodium chloride particles to minimize pulverization leaving a considerable part of the crude salt insufficiently ground, screening the ground salt through a coarse screen of about 8 mesh to remove the large particles which are returned to the grinding operation, forming a pulp of the particles which pass through the screen and removing by flotation a froth concentrate rich in potassium chloride but containing also a substantial amount of sodium chloride, treating the froth concentrate directly as taken from the froth flotation cell with water in an amount sufficient to become saturated with sodium chloride and to dissolve substantially all of the sodium chloride and some potassium chloride, said water ultimately becoming saturated in respect to both potassium chloride and sodium chloride, separating the saturated solution of potassium chloride and sodium chloride from the remaining solid potassium chloride concentrate, and evaporating the water from the solution leaving a solid mixture of potassium chloride and sodium chloride.

2. In the separation of potassium chloride and sodium chloride from solid crude salt mixtures, the improved method which comprises grinding the crude salt only sufficiently to separate in part the chlorides to minimize pulverization leaving a considerable portion of the crude salt insufficiently ground, screening the ground salt through a coarse screen of about 8 mesh to remove the large particles which are returned to the grinding operation, forming a pulp of the particles which pass through the screen and removing by flotation a froth concentrate rich in potassium chloride but containing also a substantial amount of sodium chloride, subjecting the froth concentrate without intermediate processing to a water wash to dissolve the sodium chloride and also some of the potassium chloride, the resulting solution becoming saturated with potassium chloride and sodium chloride, evaporating the water from the solution to recover a solid mixture of potassium chloride and sodium chloride.

3. In a method of separating potassium chloride and sodium chloride from crude salt mixtures the improvement which comprises grinding the crude salt only enough to form a relatively coarse product, screening the product through a coarse screen of about 8 mesh to remove large particles which are returned to the grinder, forming a pulp of the particles which pass through the screen, removing by froth flotation a concentrate rich in potassium chloride but containing also some sodium chloride, without intermediate processing for the dissolving of one of the chlorides, agitating the concentrate with water in amount sufficient to dissolve all of the sodium chloride and some of the potassium chloride, separating the resulting solution containing the sodium chloride and potassium chloride from the remaining potassium chloride, and recovering the sodium chloride and potassium chloride dissolved in the water.

4. In the separation of potassium chloride and sodium chloride from crude salt mixtures the improvement which comprises grinding the crude mixture to effect physical separation of part of the chlorides while leaving a considerable portion of the crude salt mixture insufficiently ground, screening the ground salt on a coarse screen of about 8 mesh to remove the large particles which are returned to the grinder, subjecting a pulp of the material which passes through the screen in a saturated salt solution to flotation separation to give a froth concentrate rich in potassium chloride but containing also a substantial amount of sodium chloride, agitating the froth concentrate directly as taken from the flotation cell with water in sufficient quantity to dissolve all of the sodium chloride and some potassium chloride and to form a solution saturated with respect to both sodium chloride and potassium chloride, separating the saturated solution from the remaining potassium chloride, returning a part of the saturated solution to the grinding operation and evaporating the remaining part of the saturated solution to recover solid sodium chloride and potassium chloride therefrom, and returning the recovered sodium chloride and potassium chloride to the grinding operation.

LOCKWOOD W. FERRIS.